United States Patent [19]

Whittaker et al.

[11] 4,428,444
[45] Jan. 31, 1984

[54] VARIABLE DAMPING SUBASSEMBLY FOR WEIGH CELL

[75] Inventors: Vernon Whittaker, King of Prussia; Richard Kayros, Bristol, both of Pa.

[73] Assignee: American Manufacturing Company, Inc., King of Prussia, Pa.

[21] Appl. No.: 348,492

[22] Filed: Feb. 12, 1982

[51] Int. Cl.³ ............................................. G01G 23/08
[52] U.S. Cl. .................... 177/187; 177/229; 188/319
[58] Field of Search ............... 177/187, 188, 189, 184, 177/210 EM, 229; 188/285, 319

[56] References Cited

U.S. PATENT DOCUMENTS

| 1,279,646 | 9/1918 | Bryce | 177/188 X |
| 1,663,986 | 3/1928 | Hurt | 177/188 |
| 1,773,358 | 8/1930 | Hem | 177/188 |
| 4,091,885 | 5/1978 | Oxley | 177/188 |
| 4,170,270 | 10/1979 | Sette | 177/184 |

Primary Examiner—Joseph W. Hartary
Attorney, Agent, or Firm—Nelson E. Kimmelman

[57] ABSTRACT

A damping subassembly for a weigh cell or the like comprises a sprocket wheel, a spool-like valve and a perforated piston disc assembled coaxially, the sprocket and the valve being mounted for movement in unison as the sprocket is rotated about its axis. When the sprocket-valve combination is rotated, its axial separation from the perforated disc is varied. The sprocket, valve and perforated disk are mounted to the weighing platform for axial movement in such a way that sprocket, valve and disc move upwardly and downwardly. A fixed-position bracket has an aperture in which a removable dashpot cup is mounted, the aperture and cup also being coaxially mounted relative to the sprocket, valve and piston disc. The valve-piston disc assembly moves axially into the cup through the aperture in the bracket. By rotating the sprocket, the valve-to-piston disc spacing is varied thereby causing the resistance of the movement of the valve-piston subassembly in the viscous material within the dashpot cup to be varied as desired. The cup is made to enable quick and easy rotary engagement or disengagement with the aperture in the bracket.

20 Claims, 7 Drawing Figures

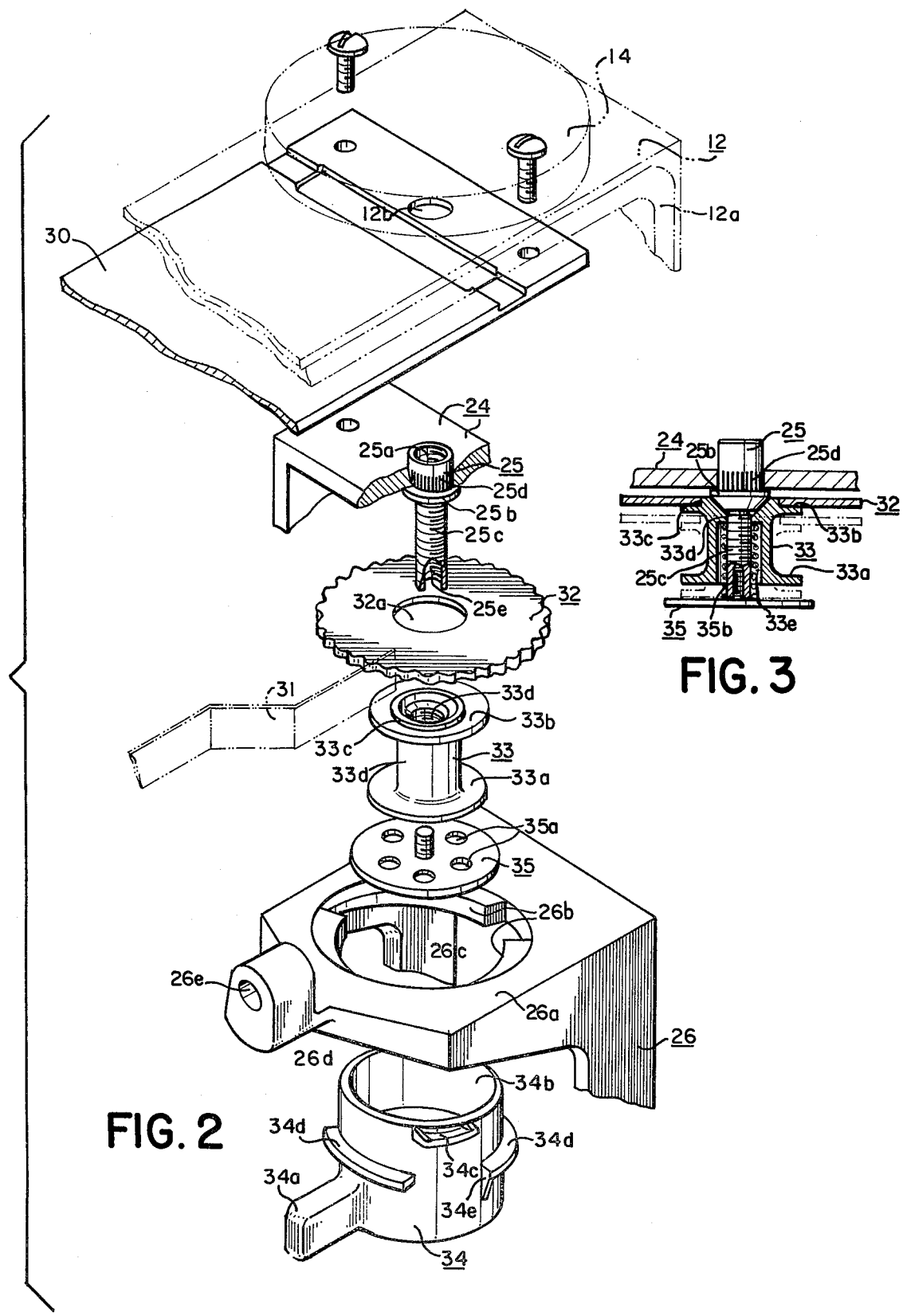

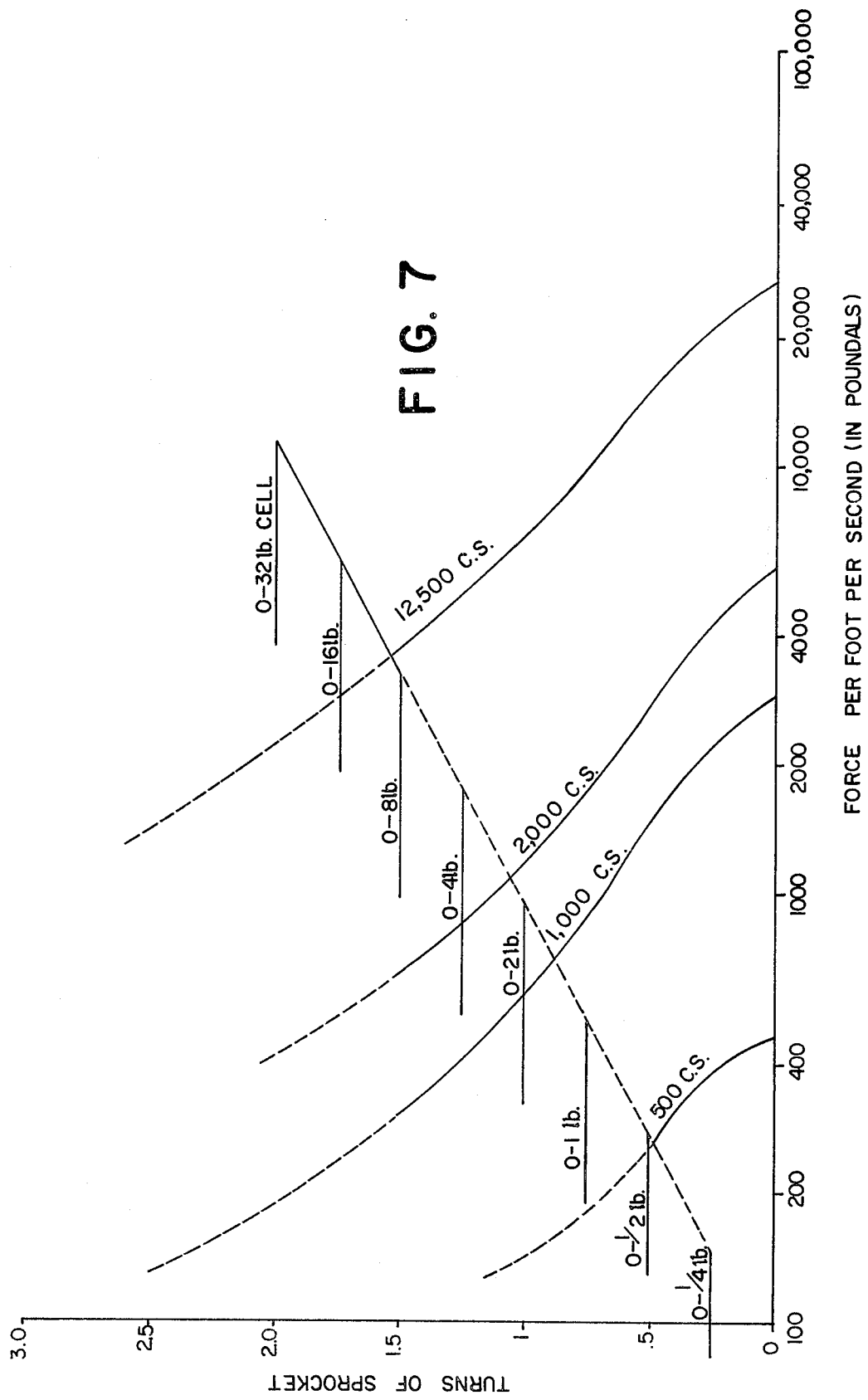

VARIABLE DAMPING SUBASSEMBLY FOR WEIGH CELL

BACKGROUND OF THE INVENTION

A. Field of the Invention

This invention relates to dashpots, and, in particular, to a dashpot mechanism for a weighing or load cell.

B. Prior Art

Weight or load cells are known which respond to pressure applied thereto by generating an electrical signal which is a function of the displacement of a movable element of the cell. One type of weigh cell marketed by Automatic Timing and Controls Co. of King of Prussia, Pa. has an element fixedly attached to a weighing platform that communicates axially with a vertically displaceable O-shaped bracket. The bracket is connected at its top and bottom by two horizonal metallic flexure members or plates to respective fixed points within the chassis. Movement of the bracket is accomplished against the flexing force of the plates and of a precision spring that restores the platform and the bracket to their original "tare" position. Attached to the bracket is one element of a signal-generating apparatus such as a linear voltage differential transformer. This movable element, which may be the armature thereof, passes coaxially through the center of the coils of the transformer. Small changes in the displacement of the bracket, and hence the armature, under load cause changes in the coupling of a signal applied to the primary winding of the transformer relative to its secondary so that the output signal has a characteristic which is a function of the bracket displacement.

In the weigh cell art, it has been desirable to incorporate damping mechanisms to prevent undesired oscillation of the movable bracket-armature assembly. One such damping mechanism employed in the above-mentioned construction involved the coaxial mounting of two truncated circular and coaxial disks as the resistance element or piston. It reciprocated within the dashpot cylinder containing the damping material, i.e., the resistance liquid. When these two disks were oriented at right angles to one another they produced effectively a circular piston head for maximum damping. Since there was a slight clearance between the composite circular configuration and the internal wall of the cylinder, damping liquid could move in the clearance opposite the direction of the piston stroke. One of the shafts to which one disk was attached had a slotted end which could be engaged by a screwdriver from outside the chassis to permit rotation of that shaft to the desired angular orientation. When the disks were disposed at congruous positions, minimum damping was accomplished. Intermediate rotary positions of the disks brought about intermediate degrees of damping.

While the above arrangement was adequate for many purposes, the size of the truncated disks did not allow much resolution of degrees of damping. Furthermore, continued movement of the slotted member in the same direction produced first, increased resistance, to a maximum and then, decreased resistance to a maximum and so on. Consequently, the position of the slotted shaft was little help in determining which direction to turn at any given moment. This aspect of the prior art made for ambiguity and was time-consuming when initial installation or maintenance calls were made.

In addition, there were no positive mechanical means for stopping at the maximum and minimum resistance points.

The geometry of this two-part piston system as embodied in those weigh cells limited the damping capacity of their dashpot mechanism. This, in turn, made the possibility of oscillation higher which adversely affects the accuracy as explained in an article by V. Whittaker in the March, 1975 issue of "Measurements and Data".

It is, therefore, among the objects of the present invention to provide a damping subassembly especially for use with weigh or load cells or the like which has 1. Greater resolution than prior damping subassemblies.
2. A more ascertainable, stepped resolution characteristic.
3. A less ambiguous variable damping positional characteristic.
4. Positive mechanical means for limiting maximum and minimum dashpot piston excursions.
5. A larger damping capacity than is available in many commercially available ones.
6. Greater ease of adjustment of the damping from outside of the cell itself.
7. An easily installed and easily removable dashpot chamber.

SUMMARY OF THE INVENTION

A variable damping dashpot assembly comprising a dashpot cup adapted to be filled with a damping material into which a piston subassembly is introduced, the subassembly comprising a perforated member and a substantially planar member above it whose spacing from said perforated member may be adjusted to vary the effective resistance of the subassembly as it is lowered into the damping material. Another feature is the provision of a dashpot cup which may be screwed into or out of a mounting bracket from below.

BRIEF DESCRIPTION OF THE DRAWINGS

FIG. 2 is an exploded, partly sectional, fragmentary view of some of the internal parts of the apparatus shown in FIG. 1 which constitute the present invention;

FIG. 3 is a side elevational view, partly broken away, showing the structural relation of the sprocket, valve and disk subassembly;

FIG. 7 is a graph showing the relation of the number of turns of the sprocket or ratchet wheel to the damping effect of the dashpot and other factors.

DETAILED DESCRIPTION OF THE INVENTION

Figure 1:
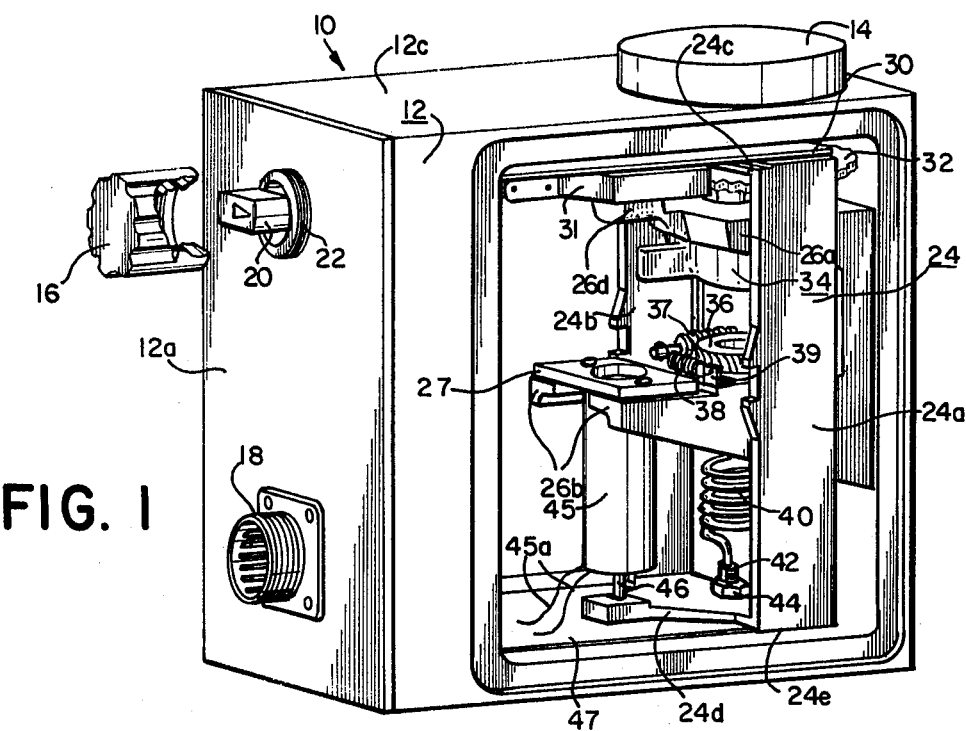
FIG. 1 is a perspective view of a commercial weigh cell with its side panel removed and showing a typical environment in which the present invention may be used.
Figure 4:
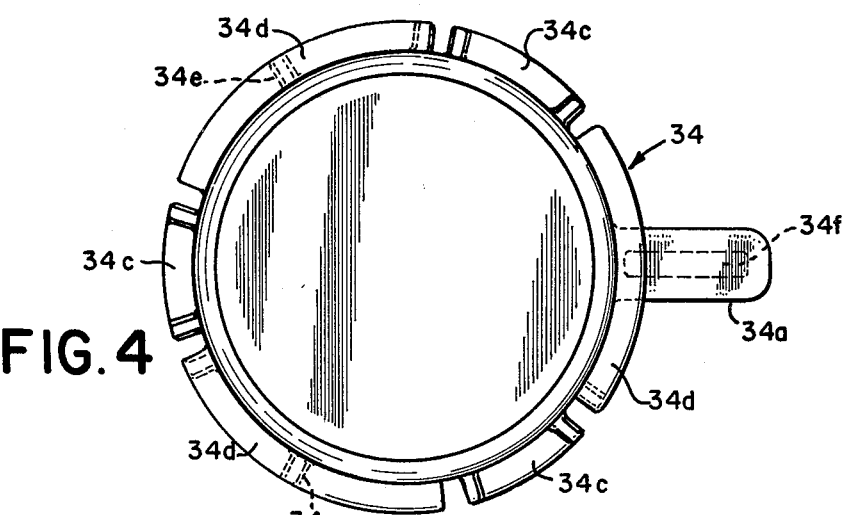
FIG. 4 is a plan view of the removable dashpot cup according to the present invention.
Figure 5:
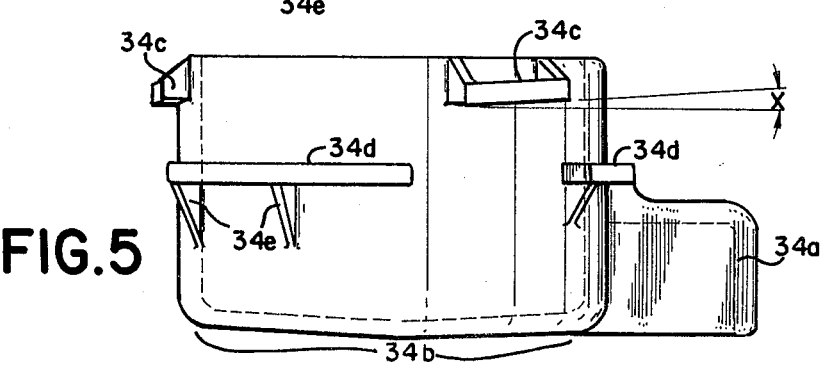
FIG. 5 is a side elevation view of the dashpot cup shown in FIG. 4.

Referring to FIGS. 1 and 2, there is shown indicated generally at the numeral 10 a weigh or load cell encased within a cast metal chassis 12. On its upper side 12c, a weighing platform 14 made out of metal is mounted. The platform is mounted to rigid means (not shown)

extending through an aperture (not shown) in the top 12c of the chassis 12 and is fixed to a movable metallic yoke or bracket 24 within chassis 12. The bracket's cross-section is generally O-shaped and it is attached at its top 24c and bottom 24e to respective flexure plates 30 and 47. The respective left ends of the plates are fixedly mounted (not shown) to fixed points within the chassis 12.

A generally C-shaped metallic bracket 26 has its vertical portion fixedly attached to the inside surface of the end wall 12b. Bracket 26 serves several purposes: (1) it provides a fixed upper point to which the upper end of the spring 40 is fastened; (2) it provides support for a tare-adjusting mechanism comprising a worm gear 36, an externally adjustable worm 37, and a spring 38 attached to the worm 37 and to anchoring means 39; (3) it also has two horizontal extensions indicated at 26b on which rests an apertured metallic slab 27 which immobilizes the top end of a differential transformer 45. The movable armature 46 of transformer 45 is fixed to a projecting portion 24d of the movable bracket 24.

The spring 40 has its top end attached to a square bolt (not shown) which is connected to the fixed bracket 26. Its lower end is attached to the square bolt 42 screwed into a threaded aperture in lower end 24e, where two nuts 44 fix it positionally. The spring 40 and the flexure plates 30 and 47 restore the bracket 24 and the platform to the non-load position after an object has been weighed and also cause the armature 46 to rise to the null-point position at that time.

The novel damping subassembly in accordance with the present invention may be more readily understood by particular reference to FIGS. 2 and 3. It includes a bolt-like member 25 whose upper end 25a is apertured to accommodate the necessary rigid mechanical coupling devices connected to the platform 14 through the aperture 12b formed in the top of the chassis 12. The top flexure plate 30 shown is screwed or otherwise attached to the top 24c of the movable bracket 24. Member 25 also includes a knurled portion 25d which fits tightly within an aperture in top 24c, the kurls preventing rotary movement and providing a secure affixation to the bracket Member 25 also has a lower threaded portion 25c which includes an axial internally threaded portion 25e.

Member 25 passes through a central aperture 32a in a sprocket wheel 32 which may include, for example, forty teeth. The portion 25c is screwed into a small threaded aperture 33d located at the upper end of the spool-like valve 33. Spool 33 has flanges 33a and 33b and central ridge 33c which fits snugly within the aperture 32a of sprocket 32. The central portion 33e of spool 33 is essentially tubular below aperture 33d to accommodate tension spring 33f which urges parts 33a and 35 away from one another. The internal, threaded aperture 25e of memory 25 screws fixedly onto the central threaded shaft 35b of a perforated metallic disc 35 which has a number of perforations 35a.

The dashpot cylinder or cup 34 may be made of plastic such as glass-filled "Delrin" plastic manufactured by E. I. Dupont and has a number of upper projections or tabs 34c which are canted slightly from the horizontal (by about 2 degrees, for example). They engage the lands 26b disposed at the perimeter of the aperture 26c formed in fixed bracket 26. This dashpot cup is preferably inserted after shipment of the weigh cell 10 and after it has been filled with a viscous silicone fluid, for example, as the damping medium. It is inserted laterally under the portion 26a until it is aligned with aperture 26c and then pushed up into the aperture 26c with the tabs 34c moving upward between spaces between lands 26b. Then it is rotated approximately 30 degrees whereupon the interaction of the tabs 34c, the lands 26b and the projections 34d screw the cup 34 up into a tight sealing position against the under surface of the horizontal part 26a of bracket 26.

As a result of the assembly of bolt 25, sprocket 32, spool 33, and disk 35, the spacing of the lower end 33a of the spool relative to the upper surface of the disc 35 may be altered by rotation of the sprocket 32 whereupon the spool 33 is rotated in the same direction. The piston disc 35, however, being screwed tightly into the aperture 25e, maintains its fixed horizontal position. As the spool is screwed clockwise and made to approach disc 35, the resistance to movement of the spool-disc combination in the viscous fluid increases to a maximum determined by the lowest possible position of the spool on the threaded portion 25c, i.e., by contact of portion 33a with piston disc 35a. Conversely, if the sprocket 32 is rotated in a counterclockwise direction (as shown in FIG. 2), the spool 33 rotates in the same direction so that the lower portion 33a moves further away from the disc 35 thereby decreasing the resistance to the movement of the disc through the dashpot fluid.

In the embodiment of FIGS. 1, 3, a resilient pawl device 31 such as shown in phantom in FIG. 2 may be used to rotate sprocket 32. This pawl may be attached to a rod (not shown), one end of which is journaled in the aperture 26e of fixed bracket 26 and its other end is fixed to the inner end of pushbutton 20. The pawl is mounted for reciprocal movement in response to pressure upon the pushbutton 20 shown in FIG. 1 which passes through an aperture in the threaded member 22. Member 22 is snapped into place in a slightly larger but essentially congruous aperture formed in end plate 12a. Each inward movement of the pushbutton 20 advances the pawl 31 into engagement with an adjacent tooth causing it to be rotated 1/40th of its cycle in a counterclockwise direction. To reverse the direction of rotation, the pushbutton 20 is pulled out a predetermined distance and rotated 180° whereupon the pawl 31 will then engage the teeth of the sprocket 32 on the side opposite the one shown in FIG. 2 causing it to rotate clockwise on each push of button 20. This reversible pawl-sprocket actuation system is described and claimed in the copending application of Kayros and Houpt, Ser. No. 335,253, filed Dec. 28, 1981, and entitled "Two-Way Pawl-Ratchet Wheel Assembly".

Figure 6:
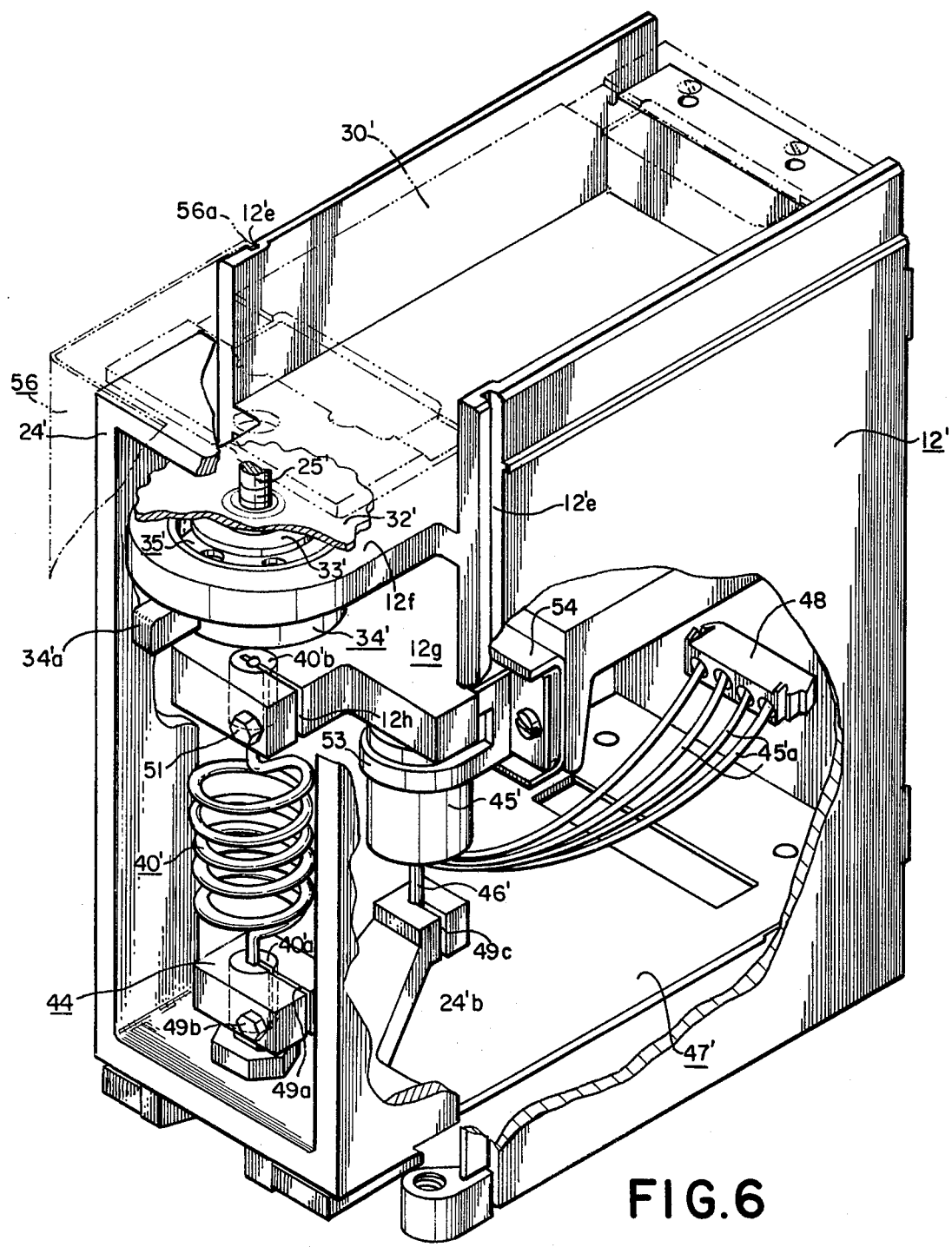
FIG. 6 is a perspective view, partly broken away and sectional, of another form of cell in which the invention maybe embodied.

Alternatively, the sprocket or ratchet wheel 32 can be turned manually in either rotary direction, dispensing with the need for a pawl arrangement as may be seen in the embodiment of FIG. 6.

Alternative Embodiment—FIG. 6

FIG. 6 shows still another environment in which the present invention may be embodied. Part numbers which are primed correspond generally to those unprimed numbers depicted in FIGS. 1 and 2. Parts above the movable bracket 24' are only shown in phantom or fragmentarily as they are arranged substantially as shown in the previous embodiments. There is a chassis or housing 12' with upper and lower flexure plates 30' and 47' respectively fastened at one end to the chassis or housing 12' and at the other end to bracket or yoke 24'. Bolt-like member 25' is fixed to yoke 24' and is coupled to sprocket 32', to the spool 33' and perforated disc 35' which pass into dashpot cup 34' having a tab 34'a that is screwed into an aperture in horizontal shelf 12f with chassis 12'. Whereas the adjustable dashpot or damping subassembly was shown in the previous drawings as being coaxial and behind the differential transformer, the present embodiment has the weighing platform connected (not shown) to the left ends of the flexure plates 30', 47' and to the yoke or bracket 24' between them. The sprocket 32', spool 33' and the perforated disc 35' are also connected coaxially therewith and move downwardly or upwardly in unison with the weighing platform. Also coaxial therewith is the spring 40' while the differential transformer 45' is mounted to the right in a bracket 53 that is screwed through C-sectioned bracket 54 into a vertical depending portion of the shelf-like inward projection 12'g. Projection 12'g, which is formed integrally with chassis 12', also includes a free left end portion which clasps the upper end of spring 40'. The armature 46' is lodged at the bottom of its shaft in a slit 24'c formed in lower extension 24'b of yoke 24' to which lower flexure plate 47' is fastened. Slit 24'c may be narrowed by screwing in a horizontal screw 24'd in extension 24'b thereby tightening the hold on the armature shaft. Wires 45'a provide current connections of the primary and secondary windings of transformer 45' to an electrical connector 48 fastened through an aperture formed in the right wall of chassis 12.

Spring 40' has its upper end connected to a cylindrical member 40'b which is disposed within an aperture in the upper bracket member 12'g. A slot 12'h communicates with the aperture so that when the bolt 51 is passed through it into the mount 52 and screwed inwardly, the slot will narrow thereby tightening the grip on the member 40'b. The lower end of the spring 40' is fixed to another cylindrical member 40'a which fits within another circular aperture in mounting block 49. A slot 49a communicates with this other aperture and is narrowed by turning screw 49b clockwise thereby increasing the hold on the member 40'a.

The construction of the embodiment shown in FIG. 6 allows economies of manufacture to be effected over the form shown in FIGS. 1, 2, due, in part, to the omission of any pawl-actuated subassembly to turn the sprocket 32' one way or the other. Instead, a left cover plate 56 which normally is slid down into place with its edges 56a in grooves 12'e may be slid upwardly to give easy access to the sprocket member 32' which may be moved manually in either rotary direction as desired.

FIG. 7 is a graph of the damping force applied by the piston as a function of the distance between the lower end 33a of the spool-like valve member 33 and the perforated piston disc 35. The y axis indicates the number of revolutions the sprocket wheel 32 (attached to valve 33) undergoes from a fully closed position ("0") in which the valve member 33a is closest to the disc 35 to the other extreme ("3.0") in which valve 33a is furthest from disc 35. Each revolution of the sprocket entails the engagement of 32 teeth by pawl 31. Since there are a maximum of three complete revolutions, there is a resolution capability of 96 possible rotary positions.

The x axis is calibrated in terms of the number of "poundals" which are defined as the number of pounds multiplied by gravity, i.e. 32.1.

The curved lines indicate, respectively, damping fluids of varying viscosities as measured in terms of centistokes.

The horizontal lines represent ranges of damping respectively required by different types of weigh cells capable of handling different maximum weights. For example, the highest horizontal line indicates a 0–32 lb. cell, the next lower line indicates a 0–16 pound cell, and the various lower horizontal lines indicate 0–8, 0–4, 0–2, 0–1, 0–½ lb. and 0–¼ lb. cells respectively.

To use the graph, the projection of the ends of the horizontal lines to the x axis is employed. Thus, for a 0–32 lb. weigh cell, it is seen that the damping force needed is in the range of 4,000–12,000 (approx.) poundals. This is determined by projections of the ends of the highest horizontal line downward onto the x axis. Those lines both intersect the 12,500 c.s. curve thereby determining the correct adjustment range of the sprocket. Since those lines intersect the 12,500 c.s. curve at approximately the 0.6 and 1.5 sprocket revolution points, the sprocket wheel may be placed in the proper range by operating the pawl button for about 19 strokes after the valve has been moved to its most closed position to 48 strokes. Thus, this graph tells which fluid to use and approximately the proper setting of the sprocket wheel for optimum results with a particular weigh cell of a selected weight range.

What is claimed is:

1. A variable dash-dot assembly comprising:
   (a) a dash-pot cup adapted to be filled with a damping material,
   (b) a perforated member disposed for movement within and along the axis of said cup,
   (c) an adjustable member having a substantially planar portion adjustably coupled to said perforated member for movement in said cup in unison with said perforated member, said adjustable member being constructed and arranged to be rotated so as to be adjustably spaced from said perforated member, and
   (d) means coupled to said (c) member for moving the latter to selected spacings from said perforated member.

2. The assembly according to claim 1 wherein said (d) means is formed to enable incremental movement of said (c) member.

3. The assembly according to claim wherein said perforated member is a disc having a plurality of perforations and wherein said substantially planar portion of said (c) member is substantially disc-like and parallel to said perforated member.

4. The assembly according to claim 3 wherein said (c) member is generally spool-shaped, one end of which being said substantially disc-like portion, said spool-like member being mounted for rotary movement relative to the axis of said perforated disc to vary its spacing relative to said perforated disc.

5. The assembly according to claim 4 with the addition of a threaded member attached coaxially to said perforated disc and wherein said spool-like member has an internally threaded portion which engages said threaded member.

6. The assembly according to claim 2 wherein said (d) means includes a ratchet wheel-like member fixed to and coaxial with said adjustable means outside of said dashpot.

7. The assembly according to claim 1 wherein said cup is separately mountable and demountable to and from said assembly.

8. The assembly according to claim 7 with the addition of fixed bracket means having an aperture therein engageable by said cup and wherein said aperture and said cup are respectively formed to enable said cup to be screwed into or out of said aperture from below it.

9. The assembly according to claim 5 wherein the upper end of said fixed threaded member is fixed to movable bracket means and whose lower end is screwed onto a threaded portion of said perforated member.

10. The assembly according to claim 8 wherein the edge of said aperture of said fixed bracket means is formed with a plurality of lands and wherein the outer surface of said cup is formed with projections which engage respective upper and lower surfaces of said lands.

11. The assembly according to claim 10 wherein said projections on said cup are angled less than 5° relative to the horizontal.

12. A weigh cell comprising:
   (a) means for engaging a load to be weighed,
   (b) a selected number of flexure plates having corresponding first ends fixed to an immobile point,
   (c) first movable bracket means coupled to the other ends of said flexure plates, said other ends also being coupled to said load-engaging means,
   (d) second fixed bracket means positioned to project into said first bracket means, said second bracket means having a first apertured portion therein, and a second portion resiliently coupled to a point on said movable bracket means,
   (e) a demountable dash-pot cup adapted to be connected to said first apertured portion and to have damping material placed therein, and
   (f) adjustable damping means coupled to another point on said first bracket means and arranged to pass at least partially through said aperture and into said cup for cooperation with the latter when provided with damping material therein to provide selectably variable damping on the displacement of said first bracket means.

13. The weigh cell according to claim 12 wherein said (a) means, said first and second portions of said (d) means and said (e) and (f) means are all substantially coaxially mounted.

14. The weigh cell according to claim 13 wherein said elements (b) through (f) are mounted within a housing and wherein electrical sensing means are coupled between said second portion of said second bracket means and said first bracket means, the back of said fixed bracket means being attached to an inner surface of one end of said housing with said electrical sensing means being disposed between said elements (b) through (f) and the opposite end of said housing.

15. The weigh cell according to claim 13 wherein said elements (b) through (f) are mounted adjacent the inner surface of a first end of a housing wherein said second bracket means projects within said housing toward said first end from the inner surface of the opposite second end of said housing to which it is fixed, wherein electrical sensing means are coupled between said second portion and said first bracket means, said sensing means being positioned between said (b) through (f) means and said second end, said first end being readily removable for enabling access to said (e) and (f) means.

16. The weigh cell according to claim 12 with the addition of signal generating means coupled to said movable bracket means and responsive to movement thereof by producing a corresponding signal related thereto.

17. The assembly according to claim 7 wherein said cup is rotatable thereby to be separately mountable and demountable to and from said assembly.

18. The assembly according to claim 17 wherein said cup has external threads formed thereupon.

19. The assembly according to claim 1 wherein said adjustable member is next-adjacent to said perforated member.

20. The assembly according to claim 1 wherein said adjustable member has a plurality of internal threads formed therein.

* * * * *